United States Patent [19]
Pfeifer

[11] 3,849,758
[45] Nov. 19, 1974

[54] SYSTEM FOR MAKING BINARY ACOUSTIC HOLOGRAMS

[75] Inventor: Jerome L. Pfeifer, Livonia, Mich.

[73] Assignee: The Bendix Corporation, Southfield, Mich.

[22] Filed: Mar. 15, 1973

[21] Appl. No.: 341,445

[52] U.S. Cl. .............................. 340/5 H, 73/67.5 H
[51] Int. Cl. .............................................. G01s 9/66
[58] Field of Search ................. 340/5 H; 181/.5 NP; 73/67.5 H

[56] References Cited
UNITED STATES PATENTS

| | | | |
|---|---|---|---|
| 3,467,216 | 9/1969 | Massey | 340/5 H X |
| 3,678,452 | 7/1972 | Silverman | 340/5 H X |

Primary Examiner—Richard A. Farley
Attorney, Agent, or Firm—James R. Ignatowski

[57] ABSTRACT

A system for making binary acoustic holograms by electronically transforming acoustic holographic information into binary form while the acoustic holographic data is being generated. The system generates a phase related blanking signal which converts the electrical signals indicative of the detected acoustic holographic information into binary form in which the intensity of the acoustical holographic information is contained in the amplitude and width of transparent binary bits while thh phase information is contained in the spacing between the bits. The binary acoustic hologram is in a form which may be reproduced on a sheet or other planar substrate which is capable of image reconstruction directly in the acoustic domain or may be used for other processing techniques.

36 Claims, 12 Drawing Figures

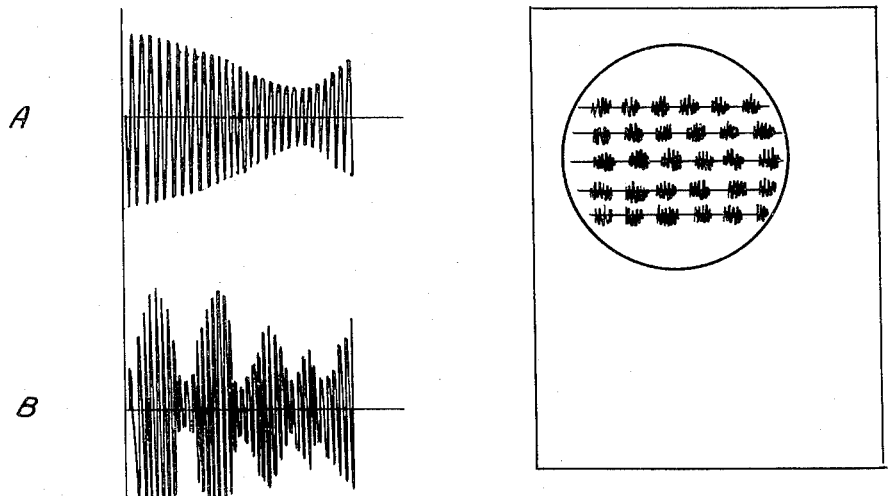
FIG. 3
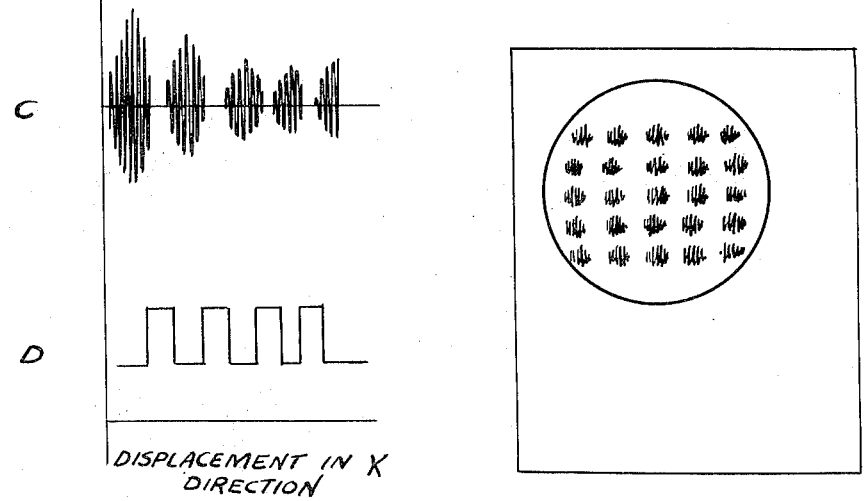
FIG. 2
FIG. 4

SYSTEM FOR MAKING BINARY ACOUSTIC HOLOGRAMS

BACKGROUND OF THE INVENTION

This invention is related to the field of acoustic holography and in particular to a method and a system for transforming acoustic holographic information into a binary form. The acoustic holographic information in binary form may be etched or otherwise reproduced in thin solid substrates producing binary acoustic holograms capable of image reconstruction directly in the acoustic domain or may be used for other processing techniques.

Lensless photography or holography as it is known by those skilled in the art is a relatively new method for the recording and storing of image information. A detailed description of the art of holography is not required because the principles are known and fully described elsewhere. However, a brief explanation of some selected aspects of holography important to this invention serve as an aid in the understanding of the invention.

In the more publicized domain of visible optics, a hologram is a photographic record of an interference pattern produced by two or more coherent wavefronts incident upon the recording media. One of the wavefronts passes over an object and is then combined with a reference wavefront to form the interference pattern on the recording medium. Thus, the recording on the record medium is very different from the type of image produced by conventional optics such as the eye, or conventional photography. Although the recorded information is visible to the naked eye, the information is unintelligible because it is a complex record of an intensity pattern produced by the interference of the wavefronts. Accordingly, in order to produce an intelligible image of the object it is necessary to illuminate the record medium with a reference beam. Such illumination produces a three-dimensional image which is perceptible to the naked eye. The recorded interference pattern is normally referred to as a hologram and the image resulting from illuminating a hologram is frequently called reconstruction. These same meanings are utilized herein.

The formation of an interference pattern is the result of a wave phenomena, therefore, the basic principles of optical holography can be extended to other types of coherent energy which are also characterized by a wave motion. In the present invention the holographic principles discussed above are extended to the acoustic domain wherein the acoustic energy, characterized by coherent wave motion, will produce an interference pattern comparable to that obtained with conventional holography in the domain of visible light.

Various methods have been used by others to make acoustic holograms. However, the acoustic holographic information is usually recorded on photographic film producing a hologram very similar to holograms produced in the optical domain using visible light. The photographic records are usually made by one of two methods. In the first method, the hologram plane receiving the reference acoustic energy and the acoustic energy reflected or refracted from the object is scanned by an acoustic detector which generates electrical signals indicative of the energy incident on the plane at each point. The electrical signals are then used to modulate the electron beam of a cathode ray tube which generates an optical equivalent of the acoustic diffraction pattern which is recorded by photographing the output of the cathode ray tube. In the second method the electrical signals indicative of the acoustic energy incident on the hologram plane as described above is used to control the brightness of a point light source adapted to synchronously move with the scanning acoustic detector, and the image of the point light source directly exposes the photographic film in accordance with the intensity of the point light source. It is also within the purview of the prior art described above to omit an actual source of reference acoustic energy and electrically simulate the acoustic reference source to generate electrical signals indicative of the desired interference pattern. The above methods produce grey tone type of intensity modulated interference patterns on photographic film indicative of the intensity variations of the acoustic interference pattern which are suitable for reconstruction purposes with laser or coherent light. However, these holographic interference patterns are not readily adaptable to reproduction in a physical form suitable for reconstruction of holographic images in the acoustic domain.

Over the recent years, research has been carried out in generating binary masks for spatial filtering and binary holograms for optical reconstruction with the aid of computers and plotters. These computer generated holograms are binary in that they consist of an array of information bits in the form of transparent apertures on an opaque background or vice versa. The transmission of light through a transparent aperture is a binary 1 (One) while the opaque background is a binary 0 (Zero). The intensity and phase relationship of the binary hologram is contained in the relationship of the size and spacing of the small transparent bits with respect to each other. The variation of the bit aperture size is related to intensity information and is similar to the techniques used in halftone printing to achieve the effect of grey scale. The spacing between the transparent bits is related to the phase relationship as in optical holographic images.

Binary and ordinary grey scale holograms are similar to the manner in which they operate on the incoming wavefront and produce the desired phase in the outgoing image wavefronts. The details of the binary holographic concept may be found in the following references. B. R. Brown and A. W. Lohmann, "Complex Spatial Filtering with Binary Masks," *Applied Optics* 5, 6, 967 (1966); A. W. Lohmann and D. P. Paris, "Binary Fraunhofer Holograms, Generated by Computer" *Applied Optics* 6, 10, 1739 (1967); B. R. Brown and A. W. Lohmann, "Computer Generated Binary Holograms," IBM J. Res. Develop. 13 2, 160, (1969); and W. J. Dallas and A. W. Lohmann, "Quantization of Hologram Transmittance" Presented at Fourth international Symposium on Acoustical Holography.

Prior to the present invention, no known suitable method has been available to transform the holographic information generated by acoustic means into binary form so that binary holograms, capable of being reproduced in sheet or plate form capable of image reconstruction in the acoustic domain, could be made.

SUMMARY OF THE INVENTION

The disclosed invention is a system and a method for directly generating a binary acoustic hologram of an object from acoustic holographic information by electronically converting electrical signals indicative of the acoustic holographic information into binary form and reproducing the converted holographic information in a manner suitable for making binary holograms operative in the acoustic domain.

An electrical equivalent of an acoustic hologram is generated by irradiating an object with coherent acoustic energy. The irradiating energy reacts with the object and is reflected or diffracted producing a complex radiation pattern about the object. A selected hologram plane, defining a predetermined portion of the complex radiation pattern, is systematically scanned with an acoustic detector. The acoustic detector generates, on a point-for-point basis, electrical signals indicative of the intensity of the acoustic radiation incident at each point on the scanned hologram plane. Simultaneously, the mechanism scanning the detector generates D.C. electrical signals indicative of the point in the hologram plane being scanned. In a cartesian coordinate system, the D.C. electrical signals are indicative of the X position and Y position of the detector in the hologram plane.

The electrical signals indicative of the intensity of the detected radiation at each point are summed with an electrical reference signal indicative of a reference irradiating acoustic energy incident on the hologram plane. The electrically summed signal contains both amplitude and phase information of the detected complex radiation pattern and is indicative of the diffraction pattern that would have been formed at the hologram plane had a reference acoustic signal been present. The amplitude component of each summed signal is then added to a D.C. signal indicative of one coordinate position of the point being scanned (i.e., Y axis position coordinate of a cartesian system). The added signals containing the amplitude information are then applied to one input of a hologram generating device such as a cathode ray tube, X-Y plotter or laser system. A signal indicative of the second coordinate position of the point being scanned (i.e., X axis position of the cartesian system) is applied to a second input control of the hologram generating device resulting in a display wherein the intensity information of the acoustic hologram is coded primarily as an amplitude modulation signal rather than as an increased brightness as in the prior art.

A blanking signal generated when the phase relationship between the detected signal and the reference signal is between predetermined values is applied to the write input of the hologram generator and converts the amplitude coded display to binary form, wherein the information indicative of the intensity information is contained in the amplitude and width of the binary bits generated between blanking pulses and the phase information is contained in the spacing between the binary bits. The blanking pulses also eliminate the interconnecting trace lines along the scan axis of the hologram generator converting the generated acoustic information into true binary form from which an acoustic hologram may be made by etching or reproducing by other means in a planar substrate. The hologram is formed by photographing the CRT display so that the image information is contained in transparent areas in an otherwise opaque plane. Reconstruction can be effected by utilizing the CRT display photograph to produce an etched substrate which creates phase shifts in the wavefront of an illuminating acoustical reference beam.

The inventive method for producing a binary hologram is characterized by generating a holographic pattern in which the intensity of the acoustic holographic information is contained in width and height (amplitude) of the transparent bits (X and Y coordinates respectively) and the phase information is contained in the spacing between the bits, the bits being defined by the transparent apertures in the opaque background.

Accordingly, it is an object of the invention to teach a method for generating a binary acoustic hologram from holographic information obtained by scanning an acoustical radiation pattern.

Another objective of this invention is to generate a binary acoustic hologram in which the intensity information is contained in the width (length along the X axis) and amplitude (Y axis modulation) of the binary bits and the phase information is contained in the spacing (along the X axis) between the binary bits.

A further objective of this invention is to generate a binary acoustic hologram which is capable of being etched or otherwise reproduced to permit reconstruction of the image in the acoustic domain.

BRIEF DESCRIPTION OF THE DRAWINGS

FIG. 2 Waveform A illustrates a typical waveform generated by the detector.

Waveform B illustrates a typical output from the sum amplifier.

Waveform C illustrates a typical output from the restore amplifier.

Waveform D illustrates a typical output from the blanking pulse generator.

FIG. 3 illustrates a binary hologram generated by the hologram generator without application of blanking pulses.

FIG. 4 illustrates a binary hologram generated by the hologram generator with blanking pulses applied.

Figure 5:
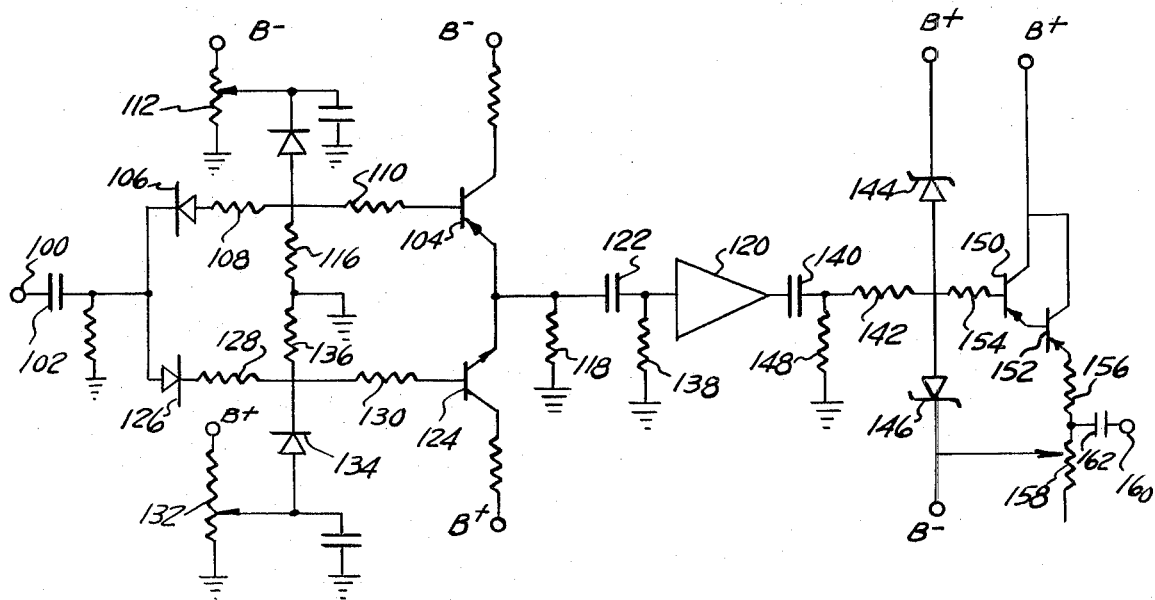

FIG. 5 is an electrical schematic of the restore circuit.

Figure 6:
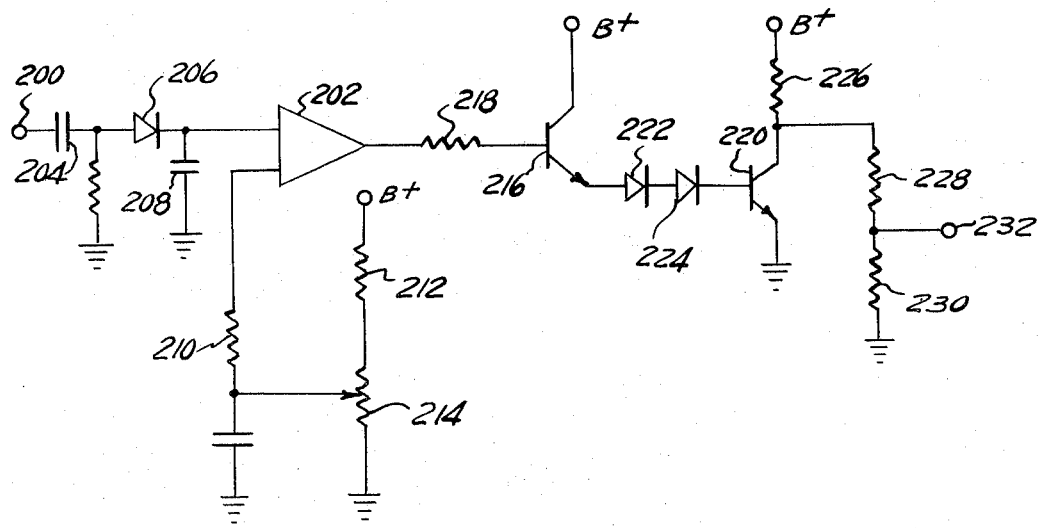

FIG. 6 is an electrical schematic of the blanking pulse generator.

Figure 7:
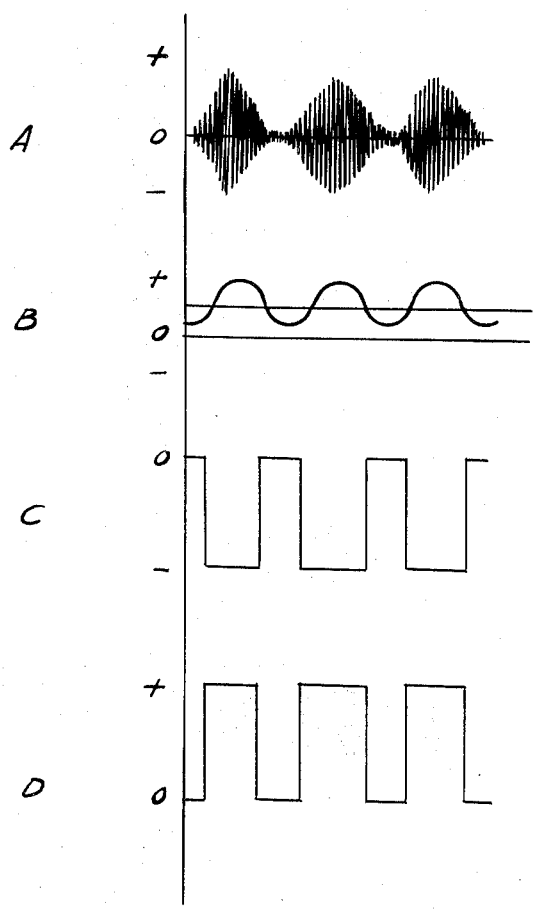

FIG. 7 Waveform A illustrates a typical output from the restore amplifiers.

Waveform B illustrates a typical output from the integrator.

Waveform C illustrates a typical output from the comparator amplifier.

Waveform D illustrates a typical output from the blanking pulse generator.

Figure 8:
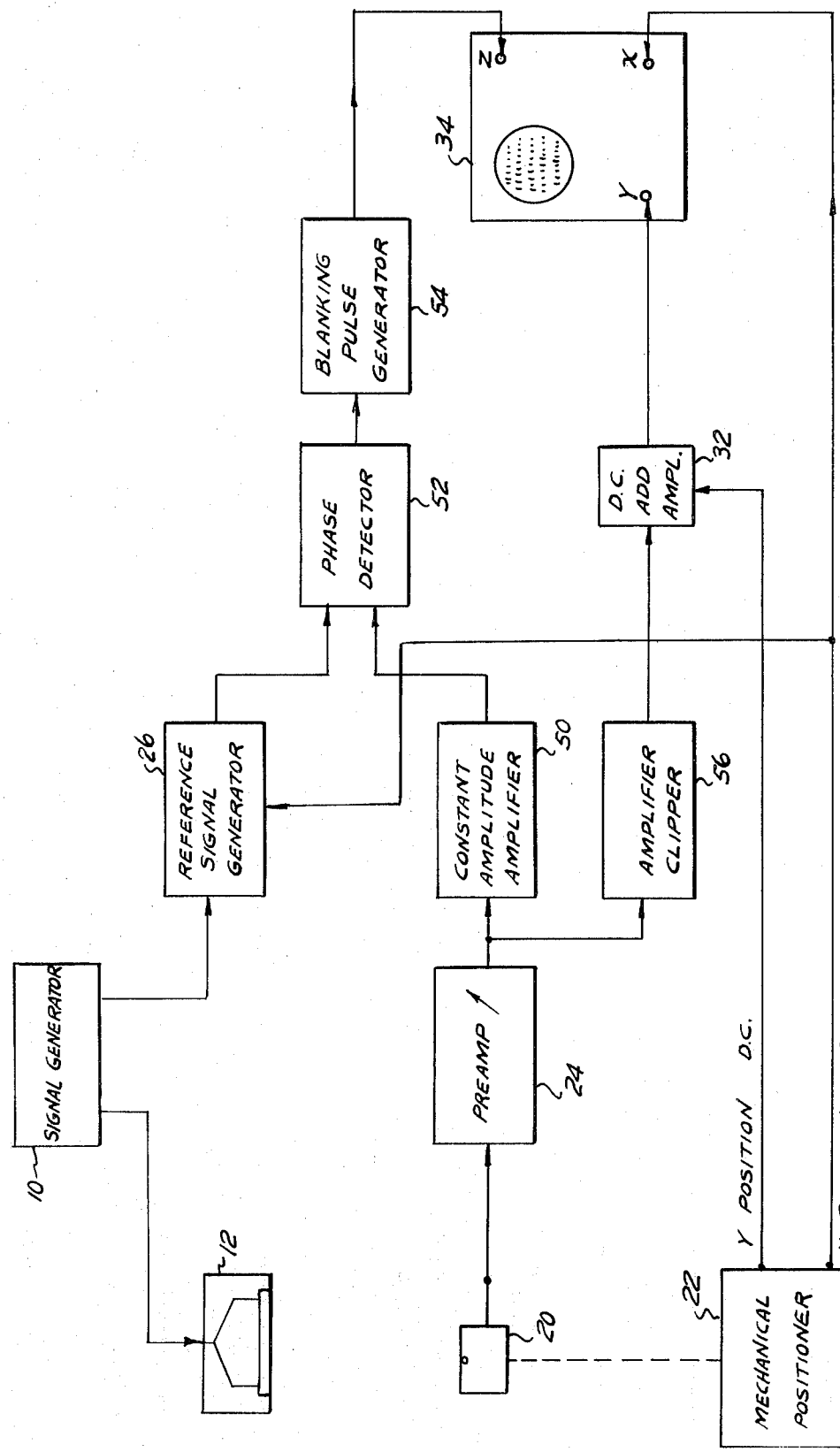

FIG. 8 is a block diagram of an alternate system for generating a binary acoustical hologram.

Figure 9:
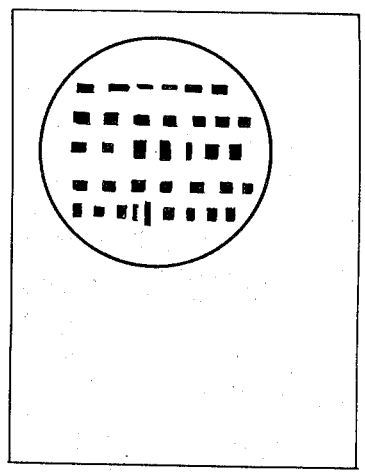

FIG. 9 illustrates a binary hologram generated by the hologram generator of the alternate embodiment.

Figure 1:
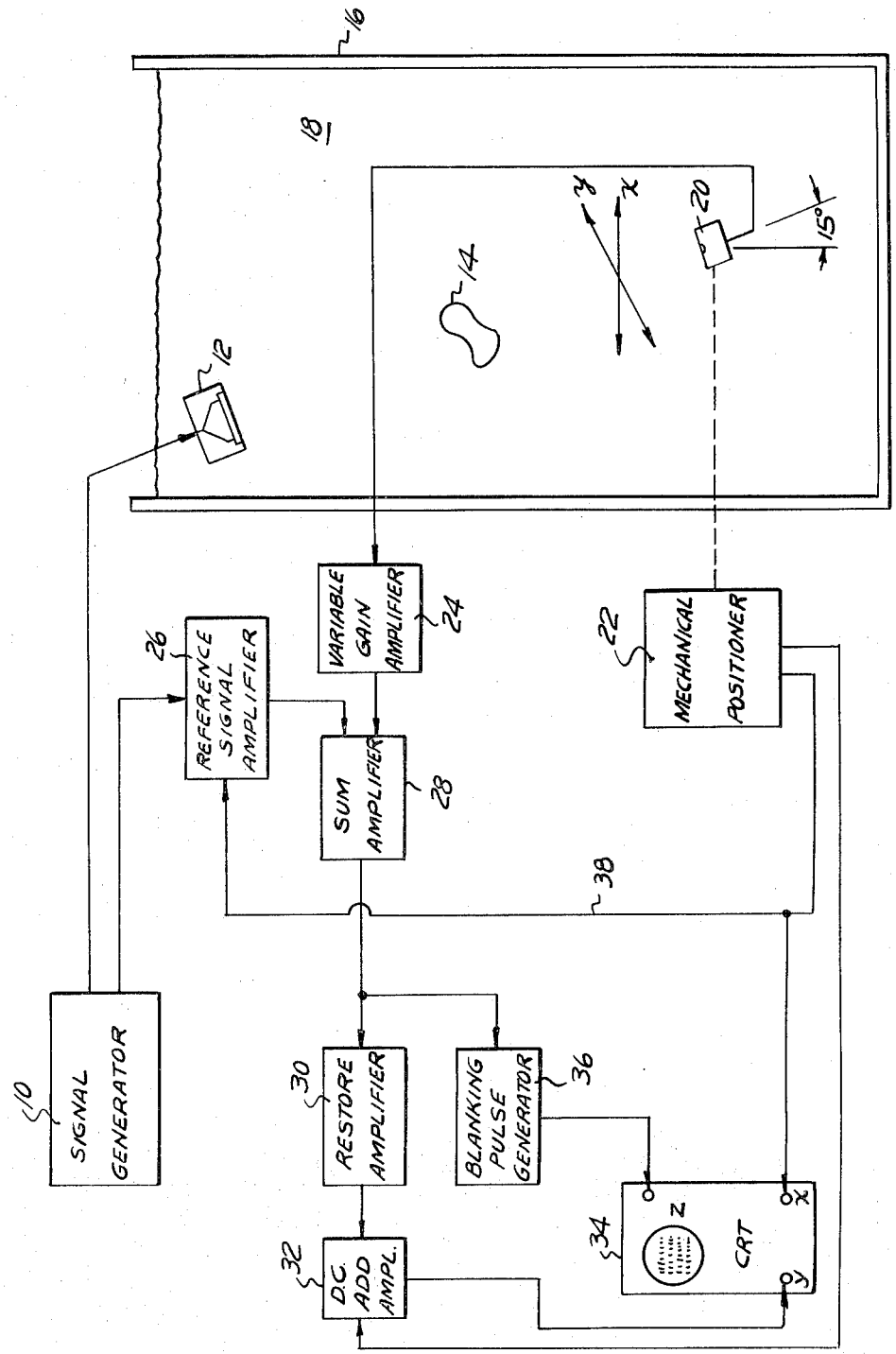
FIG. 1 is a block diagram of a system for producing a binary acoustical hologram.
Figure 10:
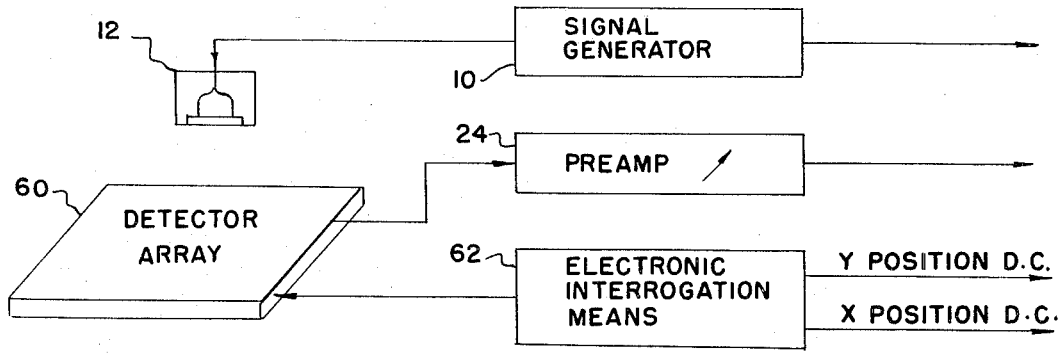

FIG. 10 illustrates a portion of the block diagrams shown in FIG. 1 embodying an array of acoustical detectors and a means for interrogating the detector array as an alternate embodiment of the system.

Figure 11:
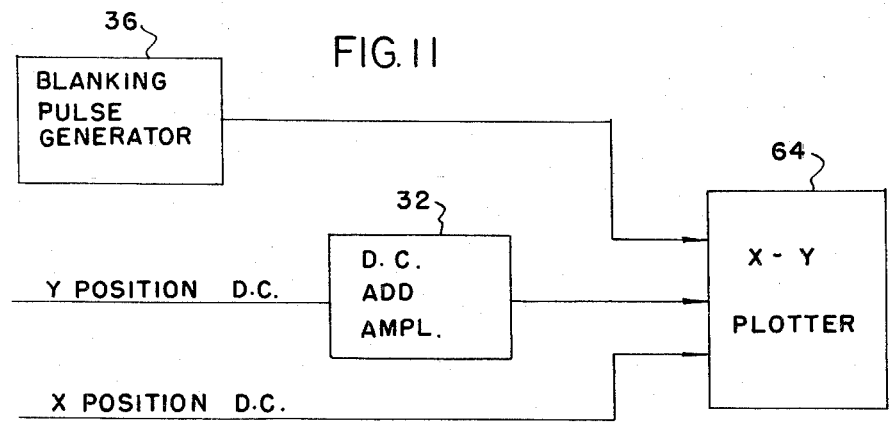

FIG. 11 illustrates a portion of the block diagrams shown in FIG. 1 embodying an X-Y plotter as the hologram generating device.

Figure 12:
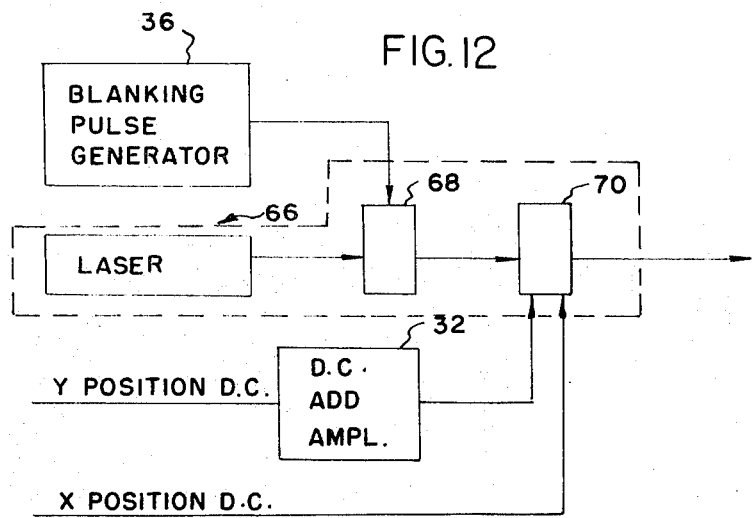

FIG. 12 illustrates a portion of the block diagram shown in FIG. 1 embodying a laser system as the hologram generating device.

DESCRIPTION OF THE PREFERRED EMBODIMENT

FIG. 1 is a block diagram of a preferred embodiment of a system for generating binary interference patterns or acoustic holograms. A signal generator 10 generates electrical signals which excites an acoustical transducer 12 resulting in the generation of coherent acoustical energy which irradiates an object 14 suspended in a vessel 16 containing a fluid 18 such as water. the acoustic energy is reflected, diffracted or passes around the object and produces a complex radiation pattern about the object. A detector 20 is caused to systematically scan a hologram plane, located proximate to the object, and angularly disposed to the incident acoustical energy by a mechanical positioner 22. The angle of the scanned hologram plane to a plane normal to the incident acoustical energy may be between 0° and 45° inclusive. An angle of approximately 15° is preferred. The detector 20 responds to acoustical energy and generates an electrical signal indicative of the intensity of the acoustical energy incident at predetermined points throughout the plane. The mechanical positioner 22 also generates electrical signals indicative of the position of the detector in the hologram plane, along the X axis and Y axis coordinates of the scanned plane. It will be recognized by a person skilled in the art that the detector may be an array of acoustic detectors 60, systematically disposed in the hologram plane and the scanning may be accomplished by means 62 electronically interrogating in a systematic manner each detector in the array, and the electrical signals indicative of the position of the point being scanned may be derived from the electronic interrogation signals as shown in FIG. 10.

The signal generated by the detector 20 is amplified by a variable gain amplifier 24 producing an amplified signal as shown in waveform A in FIG. 2.

The signal generator 10 also generates a first electrical reference signal indicative of the intensity, frequency, and phase of the acoustical signal. The first electrical reference signal is communicated to a reference signal amplifier 26 which generates a second reference signal having a constant amplitude to electronically simulate an acoustic reference wavefront normally incident upon the scanned acoustic holographic plane. However, when the scanned plane is normal to the incident radiation, or nearly so, the phase relationship of the second reference signal is controlled by a signal on line 38 indicative of the X position of the detector generated by the mechanical positioner 22 to electrically simulate an acoustic energy wavefront angularly incident upon the hologram plane. The angular disposition of the scanned acoustic hologram plane to the incident acoustic energy, discussed previously, eliminates the requirement for electrically controlling the phase of the reference signal with the X axis position signal, thereby eliminating from the reference signal generator 26 the electrical circuitry required to perform the phase control function.

The second reference signal is combined with the signal from the variable gain amplifier 24 in the sum amplifier 28. The sum amplifier 28 sums the two signals and generates a sum signal which contains the electrical equivalent of the holographic phase and intensity information required to generate a grey scale acoustical hologram. A typical example of the sinusoidal signal output from the sum amplifier 28 is shown as waveform B in FIG. 2. The sum signal is fed to a restore amplifier 30 where the amplitude component of the second reference signal is eliminated, generating an amplitude modulated restored signal as illustrated in waveform C in FIG. 2. The restored signal is then transmitted to a D.C. add amplifier 32 where the D.C. signal generated by the mechanical positioner 22, indicative of the Y position of the detector in the hologram plane, is added to output signal from the restore amplifier 30, producing a Y biased signal. The Y biased signal is then applied to the Y input control of a device for reconstructing the interference pattern or hologram generating device 34 shown in the preferred embodiment as a cathode ray tube. However, the hologram generating device may equally be an X-Y plotter 64, FIG. 11 or a laser 66 FIG. 12 system having beam deflection and beam modulating means 70 and 68 respectively, FIG. 12.

The sum signal from the sum amplifier 28 is also communicated to the blanking pulse generator 36 which generates a blanking pulse signal when the amplitude of the sum signal is less than a predetermined value. Since the amplitude of the sum signal is 0 when the phase relationship between the detected signal and the amplitude and phase adjusted reference signal is $\pi$, the predetermined value may be indicative of a phase relationship between $\pi/2$ and $-\pi/2$. The blanking pulse signals from the generator 36, illustrated as waveform D in FIG. 2, are applied to the write input control on the hologram generating device 34. In the preferred embodiment, the write input control is shown as the Z axis terminal or brightness control input of the cathode ray tube which controls the intensity of the electron beam emitted by the electron gun.

The operation of the system is as follows: The mechanical positioner systematically moves the detector 20 throughout the holographic plane on a point-for-point basis. At each point the detector 20 detects the incident acoustical energy at that point and generates an electrical signal indicative of the intensity and phase of the radiation received. The output of detector 20 is amplified by the variable gain amplifier 24 and is summed with the second reference signal from the reference signal amplifier 26 in the sum amplifier 28 generating a sum signal. The amplitude component of the second reference signal is removed from the sum signal by means of the restore amplifier 30 so that the output of restore amplifier 30 is a restored signal. The restored signal indicative of the amplitude and phase of the incident acoustic energy is then added to a D.C. signal from the mechanical positioner 22 indicative of the Y axis position of the detector in the D.C. add amplifier 32. The output of D.C. add amplifier 32 is, therefore, an amplitude modulated signal with a D.C. bias which is applied to the Y axis input of the hologram generating device 34.

The axis position of the hologram generating device is controlled by the D.C. signal from the mechanical positioner indicative of the X location of the detector.

As the hologram plane is scanned in the X direction, a comparable X axis scan is traced across the output of the hologram generating device. The Y position of the hologram generator is determined by the output of the D.C. add amplifier 32 which contains information indicative of both the Y position of the detector 20 and the intensity of the acoustic energy incident on the detector at the particular point. A complete scan of the hologram plane in the X and Y directions will produce a hologram in which the intensity information is contained in sinusoidal bits having both X and Y dimensions along each X scan line and the phase information is contained in the spacing between binary bits along the X line as illustrated in FIG. 3. This type of sinusoidal hologram, however, is not directly useful in making binary holograms in planar solid substrates because along each X scan line there is a continuity of the trace between the individual bit in the output of the hologram generator which have sufficient intensity to cause the binary hologram so formed on the planar substrate to be structurally weak and difficult to handle.

To overcome this difficulty the signal from the sum amplifier 28 is also communicated to a blanking pulse generator 36 which is operative to produce a blanking pulse signal when the amplitude component of the signal from the sum amplifier 28 falls below a predetermined level. The amplitude of the output signal from the sum amplifier 28 is a function of the phase difference between the second reference signal and the signal generated by the detector. The output of the sum amplifier is maximum when the phase relationship between the detected signal and the second reference signal is 0° or an even multiple of $\pi$, and is a minimum when the phase relationship is an odd multiple of $\pi$. The output of the blanking pulse generator is a series of pulses as shown in waveform D in FIG. 2 which are operative to terminate the writing of the hologram generator when the phase relationship between the reference signal and the detected signal is of a predetermined value such as between $+\pi/2$ and $-\pi/2$. In the preferred embodiment in which the hologram generator is a cathode ray tube, the blanking pulse is communicated to the electron gun which terminates the electron flow to the phosphor screen of the cathode ray tube when a blanking pulse is applied. The application of the blanking pulse to the hologram generator eliminates the trace line between adjacent binary bits producing a true binary hologram having a homogenous structure when reproduced by the hologram generator as shown in FIG. 4. In the binary display as shown in FIG. 4, the holographic intensity information is contained in the width and amplitude modulation of the bits generated along the X axis while the phase information is contained in the spacing between the bits. This is contrasted to the intensity modulation indicative of the intensity of the incident energy of the prior art.

The binary hologram generated may then be photographically or otherwise reproduced, and used to make binary acoustical holograms in a solid substrate, by photoetching or other known techniques. Binary holograms formed in solid substrates are capable of image reconstruction directly in the acoustic domain. When the hologram generator is a relatively powerful laser system, the laser may be used to burn out a binary hologram directly in a thin planar substrate.

FIG. 5 is a circuit diagram of a preferred embodiment of the restore amplifier 30 illustrated in block form in FIG. 1. The circuit is powered by a positive and negative power source providing electrical power at specified circuit locations in the circuit diagram designated as B+ and B− respectively. The signal from the sum amplifier 28 applied to terminal 100 is capacitively coupled to the base of transistor 104 through capacitance 102, diode 106, and series resistances 108 and 110. The junction between resistances 108 and 110 is biased negative with respect to ground by a voltage divider consisting of variable resistance 112, diode 114, and resistance 116. The negative bias generated by the voltage divider is also applied to the anode of diode 106 and the base of transistor 104 through resistances 108 and 110 respectively. The alternate branch of the restore circuit consisting of transistors 124, diodes 126 and 134, resistances 128, 130 and 136, and variable resistance 132 is the mirror image of the circuit described above. The emitters of transistors 104 and 124 are connected to ground through resistance 118 and to operational amplifier 120 through capacitance 122. The opposite side of capacitance 122 is also connected to ground through resistance 138. The output of operational amplifier 120 is capacitively coupled through capacitance 140 and resistance 142 to an amplitude limiting circuit consisting of zener diodes 144 and 146. Resistance 148 connected between the junction of capacitance 140 and resistance 142 to ground, provides a ground reference for the output signal generated by operational amplifier 120. Zener diodes 144 and 146 of the amplitude limiting circuit are operative to limit the amplitude of the output signals to predetermined positive and negative values. The limited output signal is communicated to a Darlington Amplifier consisting of transistors 150 and 152 through resistance 154. Resistance 156 and variable resistance 158 are connected in series with the emitter of transistor 152 and form an output voltage divider. The signals occurring between the junction of resistances 156 and 158 is communicated to the output terminal 160 through capacitance 162.

In operation, the signal generated by the sum amplifier 28 is applied to terminal 100. The negative signals in excess of the bias potential determined by variable resistance 112 is communicated to the base of transistor 104 through diode 106, resistance 108 and 110. In like manner a positive signal occurring at terminal 100 is communicated to the base of transistor 124 through diode 126 and resistances 128 and 130. In a steady-state condition with no signal applied to terminal 100, both transistors 104 and 124 are partially conductive and are operative to provide a fixed potential across resistance 118. A negative pulse applied to terminal 100 in excess of the negative bias applied to the anode diode 106 from the variable resistance 112 will cause diode 106 to conduct increasing the emitter to base current of transistor 104. The increase emitter to base current of transistor 104 increases the conductance of transistor 104 causing a negative pulse to occur across resistance 118. In like manner a positive pulse communicated to terminal 100 in excess of the positive bias applied to diode 126 by means of variable resistance 132 causes an increased current in the base to emitter terminals of transistor 124 and produces a positive pulse across resistance 118. The positive and negative pulses occurring across resistance 118 are communicated to operational amplifier 120 through capacitance 122. Capacitance 122 and resistance 138 form an R.C. circuit which provides a smooth transition of the signal between the occurrence of positive and negative signals. The output signal from operational amplifier 120 is communicated to the amplitude limiting circuit consisting of zener diodes 144 and 146 through capacitance 140 and resistance 142. The amplitude limiting circuit as stated above, is operative to limit the amplitude of the signal generated by operational amplifier 120 to predetermined positive and negative values so that the maximum amplitude of the restored signals will be slightly less than one-half the distance between raster lines on the display device. The amplitude limited signals are then amplified by the Darlington circuit and are communicated to the output terminal by capacitance 162 from the junction between resistance 156 and variable resistance 158 in the emitter circuit of transistor 152. Variable resistance 158 controls the magnitude of the output signal. The positive and negative bias potentials applied to diodes 126 and 106 from variable resistances 132 and 112 are adjusted so that only input signals which exceed the amplitude of the second reference signals can be communicated to the bases of transistors 124 and 104, respectively. By this means the amplitude of the signal from the reference signal amplifier 26 is effectively removed from the output of the restore amplifier and the output signal contains only the amplitude and phase information of the detected signals.

FIG. 6 is a circuit diagram of the blanking pulse generator 36 illustrated in block form in FIG. 1. The blanking pulse generator circuit is powered by an electrical power source at the various circuit locations on the diagram designated as B+. The signal from the sum amplifier 28 illustrated in FIG. 1 is applied to terminal 200 and is communicated to the comparator amplifier 202 through coupling capacitor 204 and diode 206. The diode 206 and capacitor 208 form an integrating circuit converting the positive portion of the oscillating sum signals into an integrated signal indicative of the envelope of the positive portion of the sum signals. A bias potential is applied to the alternate input of the comparator amplifier 202 through resistance 210 from the voltage dividers network consisting of resistance 212 and variable resistance 214. The output of the comparator amplifier is communicated to the base of the buffer amplifier transistor 216 through resistance 218. The emitter of the buffer amplifier 216 is connected to the base of transistor 220 through serially connected diodes 222 and 224 respectively. The connector transistor 220 is connected to the positive electrical power source B+ through resistance 226 and to ground through a voltage divider consisting of resistance 228 and 230. The output terminal 232 is connected to the junction between resistances 228 and 230.

In operation, the output of the comparator amplifier 202 in the absence of a signal from the integrator consisting of diode 206 and capacitor 208 is a current signal sufficient to cause buffer amplifier 216 and transistor 220 to be conducted. The conductance of transistor 220 effectively grounds the junction between resistance 226 and the collector of transistor 220 causing a ground signal to appear at the output terminal 232. This ground signal is operative to turn off the electron gun of the cathode ray tube.

A sum signal shown as waveform A in FIG. 7 is communicated to the integrator circuit consisting of diode 206, capacitance 208 from the input terminal 200 through capacitance 204. The integrator integrates the acoustical signal and produces an integrated signal as indicated by waveform B on FIG. 7 which is applied to an input terminal of the comparator amplifier 202. A bias signal is also applied to an alternate input terminal of comparator 202 from the voltage divider network consisting of resistance 212 and variable resistance 214. The bias potential from the voltage divider network is adjusted so that only voltages above a predetermined value from the integrator will cause the comparator amplifier to generate a signal. The comparator amplifier 202 is a nonlinear amplifier which saturates when the signals from the integrator exceeds the bias potential. Therefore, the output from the comparator amplifier is a pulse signal as shown in waveform C of the comparator amplifier. The negative pulses generated by the comparator amplifier 202 applied to the base of buffer amplifier 216 are of sufficient magnitude to place the buffer amplifier in the nonconductive state. Nonconductance of the buffer amplifier terminates the base to emitter current of the transistor amplifier 220, placing transistor 220 in the nonconductive state. When transistor 220 is nonconductive, the potential occurring between resistance 226 and the collector of transistor 220 rises to a value approximately equal to B+. The primary current flow is now through the voltage divider consisting of resistance 228 and 230 and places the positive potential on the output terminal 232. A positive potential on the output terminal 232 applied to the brightness input control of a cathode ray tube is sufficient to turn the electron gun ON.

As seen from the above description of the blanking pulse generator, the electron gun of the cathode ray tube is normally held in the OFF condition when the signal generated by the integrator circuit is less than a predetermined value determined by the bias voltage applied to the alternate input of the comparator amplifier. A signal from the integrator more positive than the predetermined value determined by the bias potential produces a positive pulse at the output terminal 232 turning the electron gun of the cathode ray tube ON. Therefore, the electron beam of the cathode ray tube will only produce an output signal on the phosphor screen when the acoustical holographic signal is greater than the predetermined value. The blanking pulse applied to the cathode ray tube electron gun when the signal is less than a predetermined value effectively removes the interconnecting traces between the binary elements on the phosphor screen of the cathode ray tube.

An alternate embodiment of the invention is illustrated in FIG. 8. The system consists of an acoustic generator 12, a detector 20, a mechanical positioner 22 and signal generator 26 which as indicated by identical reference numerals are the same as the corresponding system of FIG. 1. The object 14, vessel 16 and the fluid 18 are not shown. The signal generator 10 generates an RF signal which is transmitted to the acoustic generator 12 and to a reference signal generator 26. Acoustic transducer 12 produces an acoustical output in response to the energizing electrical signal from generator 10. The acoustical output of transducer 12 illuminates an object, of which a hologram is to be made. Detector 20 transduces the image bearing acoustical energy coming from the object into electrical signals having both phase and amplitude variations due to the interaction of the acoustic energy with the object.

The reference signal generator 26 generates a constant amplitude and phase adjusted electrical signal having the same frequency as the signal generated by the signal generator 10. The output signal from the detector 20 is amplified in a variable gain amplifier 24 and converted to a constant amplitude signal by the constant amplitude amplifier 50. The signals from the constant amplitude amplifier 50 and the reference signal generator 26 are combined in the phase detector 52 which generates a signal when the phase relationship between the signal received from the reference signal generator 26 and the constant amplitude amplifier 50 is within predeterminable limits. For example, the phase detector 52 could generate a pulse when the phase relationship between the two signals is between $-\pi/2$ and $+\pi/2$. The output signal from the phase detector 52 is amplified in the blanking pulse generator 54 which generates the blanking pulse as shown in waveform D of FIG. 2. The blanking pulse is applied to write input of the hologram generator which in the illustrated embodiment is the Z axis input or the brightness control for a cathode ray tube.

The output of the preamplifier 24 is also amplified by amplifier/clipper 56 which generates an output signal proportional to the intensity of the signal received by detector 20, but is limited to a maximum plus or minus amplitude which is indicative of less than one-half the distance between the X axis scans. The D.C. signal from the mechanical positioner 22 indicative of the Y position of the detector 20 is added to the output signal from the amplitude/clipper 56 in the D.C. add amplifier 32. The output of the D.C. add amplifier 32 is applied to the Y axis input of the hologram generator 34. As in FIG. 1, a signal indicative of the X position of the detector 20 generated by the positioner 22 is applied to the X axis input of the hologram generator 34.

Because the part of the signal from the detector 20 that is amplified by amplifier/clipper 58 is not mixed with the reference signal from the reference signal generator 26 as in the preferred embodiment, the amplified signal in the alternate embodiment supplied to the Y axis of the hologram generator is only amplitude modulated and phase modulation is accomplished by the blanking pulses from the blanking pulse generator 54. Therefore, the binary bits produced on the output of the display device 34 of the alternate embodiment are more rectangular in form, as illustrated in FIG. 9, rather than sinusoidal as illustrated in FIG. 4. Although the shape of the binary bits take slightly different forms in the two described embodiments, the acoustical holographic information of the two binary holograms are comparable, and their ability to form an image in the acoustic domain is equivalent.

While preferred embodiments of the invention have been disclosed, it will be apparent to those skilled in the art that changes may be made to the invention as set forth in the appended claims and in some instances, certain features of the invention may be used to advantage without corresponding use of other features. For example, the acoustic energy may be pulsed rather than continuous as in the preferred embodiments, the binary bits may be made opaque and the background transparent for optical reconstruction, or that parts of the two disclosed embodiments may be interchanged. Accordingly, it is intended that the illustrative and descriptive materials herein be used to illustrate the principles of the invention and not to limit the scope thereof.

What is claimed is:

1. A system for making binary acoustic holograms of an object comprising:

means for generating electrical energy;

first means receiving said electrical energy for producing coherent acoustic energy, said coherent acoustic energy irradiating said object;

second means receiving said electrical energy for producing a reference electrical signal having the same frequency as said electrical energy with a predetermined phase and amplitude;

means detecting said acoustic energy incident on a hologram plane in the proximity of said object for generating, on a point-for-point basis, detected electrical signals indicative of the intensity of said acoustical energy, including means for generating signals indicative of the X and Y axis positions of said points with respect to said hologram plane;

means responsive to said reference electrical signals and said detected electrical signals for generating phase modulated signals indicative of the intensity and phase of said detected acoustic energy;

means responsive to said phase modulated signals for generating a blanking signal when the amplitude component of said phase modulated signal is less than a predetermined value;

means responsive to said phase modulated signal and said Y position signal for summing said phase modulated signals and said Y position signal generating a Y biased signal; and means responsive to said Y biased signals, said Y position signal and said blanking signal for generating a binary interference pattern.

2. The system of claim 1 wherein said hologram plane is disposed at an angle between 0° and 45° to a plane normal to the direction of the incident acoustic energy.

3. The system of claim 1 wherein said means for generating said detected electrical signals includes:

an acoustic detector responsive to said acoustic energy for generating electrical signals indicative of the intensity of said energy incident on said detector; and means for systematically scanning said hologram plane, with said detector, wherein said means for systematic scanning includes said means for generating signals indicative of the position of said detector along said x axis and said Y axis in said hologram plane.

4. The system of claim 1 wherein said means for generating said detected signals includes:

an array of acoustic detectors forming a hologram plane for generating signals indicative of the intensity of the acoustic energy incident upon said array; and means for systematically interrogating each detector in said array including means for generating signals indicative of the location of the detector being interrogated along said X axis and said Y axis.

5. The system of claim 1 wherein said means for generating said phase modulated signals comprises:

means responsive to said reference signals and said detected signals for combining said reference signals and said detected signals and generating sum signals;

means responsive to said sum signals for removing from said sum signal the amplitude component of said generated signal and generating restored phase modulated signals; and means for limiting the amplitude component of said restored phase modulated signal when the amplitude component of said phase modulated signal exceeds predetermined maximum and minimum values.

6. The system of claim 1 wherein said scanned hologram plane is approximately normal to the direction of said irradiating acoustic energy, said means for generating said reference signal further includes means responsive to said X-axis position signal to control the phase of said reference signal to electrically simulate a reference acoustic energy wavefront angularly incident on said hologram plane.

7. The system of claim 1 wherein said means for generating a binary interference pattern is a cathode ray tube.

8. The system of claim 1 wherein said means for producing a binary interference pattern is a X-Y mechanical plotter including means for converting said phase modulated signal to a lower frequency phase modulated signal compatable with the frequency response characteristics of the X-Y plotter.

9. The system of claim 1 wherein said means for producing a binary interference pattern is a laser system including means for deflecting the laser beam along mutually perpendicular X and Y axis in response to electrical input signals and means for modulating the laser beam in response to the blanking signals.

10. A system for making binary acoustic holograms of an object comprising:
   means for generating electrical energy;
   first means for receiving said electrical energy for producing coherent acoustic energy, said coherent acoustic energy irradiating said object;
   second means receiving said electrical energy for producing a reference electrical signal having the same frequency as said electrical energy and a predetermined phase and amplitude;
   means detecting said acoustic energy incident on a hologram plane in the proximity of said object for generating, on a point-for-point basis, detected electrical signals indicative of the intensity of said acoustic energy including means for generating signals indicative of the X and Y positions of said points with respect to said hologram plane;
   means responsive to said reference signals and said detected signals for generating a blanking signal when the phase relationship between said reference signal and said detected signals is between predetermined valves; and
   means responsive to said detected signals for limiting the maximum amplitude of said detected signals;
   means adding said limited detected signals to said Y axis position signal for generating Y biased signals; and
   means responsive to said Y biased signals, said blanking signals, and said X axis position signals for generating a binary interference pattern.

11. The system of claim 10 wherein said hologram plane is disposed at an angle between 0° and 45° to a plane normal to the direction of the incident acoustic energy.

12. The system of claim 10 wherein said means for generating said detected electrical signals includes:
   an acoustic detector responsive to said acoustic energy for generating electrical signals indicative of the intensity of said energy incident on said detector; and
   means for systematically scanning said holographic plane with said detector wherein said means for systematically scanning includes said means for generating signals indicative of the X axis and Y axis position of said detector in said hologram plane.

13. The system of claim 10 wherein said means for generating said detected electrical signals includes:
   an array of acoustic detectors forming said hologram plane for generating signals indicative of the intensity of the acoustic energy incident upon said array; and
   means for systematically interrogating each detector in said array including means for generating signals indicative of the X axis and Y axis position of the detector being interrogated.

14. The system of claim 10 wherein said blanking pulse generating means includes:
   phase detector means, responsive to said reference signals and said detected signals for generating a phase signal when the phase between the generated signals and the detected signals is between predetermined limits; and
   a pulse generator responsive to said phase signals for generating said blanking signal.

15. The system of claim 14 wherein said phase detector generates a signal when the phase relationship between said reference signal and detected signal is between $-\pi/2$ and $+\pi/2$.

16. The system of claim 10 wherein said scanned hologram plane is approximately normal to the direction of said irradiating acoustic energy, said means for generating a reference signal further includes means responsive to said X axis position signal to control the phase of said reference signal to electonically simulate a reference acoustic energy wavefront angularly incident on said hologram plane.

17. The system of claim 10 wherein said means for generating a binary interference pattern is a cathode ray tube.

18. The system of claim 10 wherein said means for producing a binary interference pattern is a X-Y mechanical plotter including means for converting said Y bias signal to a signal compatable with the response characteristics of the plotter.

19. The system of claim 10 wherein said means for producing a binary interference pattern is a laser system including means for deflecting the laser beam along mutually perpendicular axes in response to electrical input signals and means for modulating the laser beam in response to the blanking signals.

20. A method for making a binary acoustic hologram from an object comprising the steps of:
   irradiating said object with coherent acoustic energy causing said acoustic energy to react with said object;
   generating a reference electrical signal having a constant amplitude component, and predetermined phase relationship to said irradiating acoustic energy;
   detecting said acoustical energy on a hologram plane in the proximity of said object and generating a detected electrical signal indicative of the intensity of the acoustic energy incident on said hologram plane;

generating X axis and Y axis position signals indicative of the position of said detected signals in said hologram plane;

summing said reference signal and said detected signal to generate a phase modulated signal;

generating a blanking signal in response to said phase modulated signal when the amplitude component of said phase modulated signal is less than a predetermined value;

adding said Y axis position signal to said phase modulated signal to form a Y biased signal; and applying said blanking signal, said X axis position signal, and said Y biased signal to a means for generating a hologram.

21. The method of claim 20 wherein said step of detecting said acoustical energy includes the step of mechanically scanning with an acoustic detector a plane angularly disposed to a plane normal to said incident radiant energy between the angles of 0° and 45° wherein said angularly disposed plane is said hologram plane.

22. The method of claim 20 wherein said step of detecting said acoustical energy includes the step of systematically interrogating an array of acoustic detectors lying in a plane angularly disposed to a plane normal to the direction of the incident radiant energy between the angles of 0° and 45° wherein said angularly disposed plane is said hologram plane.

23. The method of claim 20 wherein said step of summing includes the steps of:
   summing said reference signal with said detected signal to generate a sum signal;
   subtracting from said sum signal the amplitude component of said reference signal to generate a subtracted signal; and
   limiting the amplitude component of said subtracted signal by clipping the amplitude component of said subtracted signal when the amplitude component exceeds a predetermined value forming said phase modulated signal.

24. The method of claim 21 wherein said scanned plane is approximately normal to the direction of said irradiating acoustic energy, said step of generating a reference signal includes the steps of adjusting the phase of said reference signal in response to said X axis position signal to generate a phase adjusted reference signal to electrically simulate an acoustic energy wavefront angularly incident on said hologram plane.

25. The method of claim 20 wherein said step of generating said blanking signal includes the steps of:
   rectifying a portion of the amplitude component of said phase modulated signal to generate an integrated signal;
   amplifying said integrated signals with a nonlinear comparator amplifier to generate a pulse signal; and
   amplifying said pulse signal to generate a blanking signal.

26. The method of claim 20 wherein said means for generating a hologram is a cathode ray tube, said step of applying comprises the steps of:
   applying the X axis position signal to a deflection input terminal on said cathode ray tube to deflect the electron beam along one axis of said cathode ray tube;
   applying said Y biased holographic signal to a second input terminal of said cathode ray tube to deflect the electron beam of said cathode ray tube in a direction normal to the direction in which the beam is deflected by the X axis position signal; and
   applying the blanking signal to the brightness control terminal of said cathode ray tube to control the intensity of the electron beam.

27. The method of claim 20 wherein said means for generating a hologram is an X-Y plotter, including means for converting the high frequency holographic signals to signals compatable with the response of said plotter, said step of applying comprises the steps of:
   applying the X position signal to a first coordinate input terminal on said recorder deflecting the writing device along a first axis;
   applying said Y biased signal to said converting means and applying the converted signal to a second input terminal on said X-Y plotter to deflect the writing device along a second axis of said plotter; and
   applying said blanking pulse signal to the write input terminal of said plotter, terminating the writing of said plotter in response to said blanking signals.

28. The method of claim 20 wherein said means for generating a hologram is a laser system including means for deflecting the laser beam in mutually perpendicular axes and means for modulating said laser beam, said steps of applying said signals comprises the steps of:
   applying said X axis position signal to a first input of said deflection means to deflect said laser beam along a first axis;
   applying said Y biased signal to a second input of said deflection means to deflect said laser beam along said mutually perpendicular axis; and
   applying said blanking pulse signal to the input of said modulating means to modulate said laser beam.

29. A method for making a binary acoustic hologram of an object comprising the steps of:
   irradiating said object with coherent acoustic energy causing said acoustic energy to react with said object;
   generating an electrical reference signal having constant amplitude and having a predetermined phase relationship to said irradiating acoustic energy;
   detecting said acoustical energy on a hologram plane in the proximity of said object and generating a detected electrical signal indicative of the intensity of the acoustic energy incident on said hologram plane:
   generating X axis and Y axis position signals indicative of the position of said detected signals in said hologram plane;
   comparing said constant amplitude reference signal to said detected signal to generate a phase signal indicative of the phase relationship between said detected signal and said reference signal;
   generating a blanking pulse signal in response to said phase signal when said phase relationship between the reference signal and the detected signal is between predetermined values;
   adding said detected signal to said Y axis position signal to generate a Y biased signal; and
   applying said blanking signal, said X axis position signal, and said Y biased signal to a means for generating a hologram.

30. The method of claim 29 wherein said step of detecting said acoustical energy includes the step of mechanically scanning with an acoustic detector a plane angularly disposed to a plane normal to said incident radiation between the angles of 0° and 45° wherein said angularly disposed plane is said hologram plane.

31. the method of claim 29 wherein said step of detecting said acoustical energy includes the step of systematically interrogating an array of acoustic detectors lying in a plane angularly disposed to a plane normal to said incident radiant energy at an angle between 0° and 45° wherein said angularly disposed plane is said hologram plane.

32. The method of claim 29 wherein said hologram plane is approximately normal to the direction of said irradiating acoustic energy, said step of generating an electrical reference signal includes the step of adjusting the phase of said reference signal in response to said X axis position signal to generate a phase adjusted reference signal to electrically simulate an acoustic energy wavefront angularly incident on said hologram plane.

33. The method of claim 29 wherein said step of detecting and generating detected electrical signals includes the step of amplifying said detected signals and clipping said amplified signals when the amplitude of said amplified signals exceeds predetermined values.

34. The method of claim 29 wherein said means for generating a hologram is a cathode ray tube, said step of applying comprises the steps of:
applying said X axis position signal to a deflection input terminal on said cathode ray tube to deflect the electron beam along one axis of said cathode ray tube;
applying said Y biased signal to the second input terminal of said cathode ray tube to deflect the electron beam of said cathode ray tube in a direction normal to the direction in which the beam is deflected by the X axis position signal; and
applying the blanking signal to the brightness control terminal of said cathode ray tube to control the intensity of the electron beam.

35. The method of claim 29 wherein said hologram generating device is an X-Y plotter, said step of applying comprises the steps of:
applying the X position signal to a first coordinate input terminal on said plotter deflecting the writing device along a first axis;
applying said Y biased signal to a second input terminal on said plotter to deflect the writing device along a second axis of said recorder; and
applying said blanking pulse signal to the write input terminal of said recorder lifting said writing device to prevent writing while said blanking pulse signal is applied.

36. The method of claim 29 wherein said means for generating a hologram is a laser system including means for deflecting the laser beam in mutually perpendicular axes and means for modulating said laser beam, said steps of applying said signals comprises the steps of:
applying said X axis position signal to a first input of said deflection means to deflect said laser beam along a first axis;
applying said Y biased signal to a second input of said deflection means to deflect said laser beam along said mutually perpendicular axis; and
applying said blanking pulse signal to the input of said modulating means to modulate said laser beam.

* * * * *

UNITED STATES PATENT OFFICE
CERTIFICATE OF CORRECTION

PATENT NO. : 3,849,758
DATED : November 19, 1974
INVENTOR(S) : Paul T. Higgins

It is certified that error appears in the above-identified patent and that said Letters Patent are hereby corrected as shown below:

Column 6, Line 57, after the word The insert the letter --- X ---

Column 13, Line 49, change "valves" to --- values ---

Signed and Sealed this twenty-ninth Day of July 1975

[SEAL]

Attest:

RUTH C. MASON
Attesting Officer

C. MARSHALL DANN
Commissioner of Patents and Trademarks